United States Patent [19]

Davidson et al.

[11] 4,085,814
[45] Apr. 25, 1978

[54] MOTORIZED BICYCLE

[75] Inventors: Charles Patrick Duncan Davidson, Droitwich; Harry Simister Bottoms, Solihull, both of England

[73] Assignee: Lucas Industries Limited, Birmingham, England

[21] Appl. No.: 697,279

[22] Filed: Jun. 18, 1976

[30] Foreign Application Priority Data

Jun. 21, 1975 United Kingdom ............... 26449/75

[51] Int. Cl.² ............................................. B62M 7/00
[52] U.S. Cl. .................................. 180/33 C; 180/34; 180/65 A
[58] Field of Search .................... 180/33 R, 33 C, 34, 180/65 A

[56] References Cited

U.S. PATENT DOCUMENTS

| 2,457,430 | 12/1948 | Argyris | 180/33 R |
| 3,513,928 | 5/1970 | Emmons | 180/34 |
| 3,773,131 | 11/1973 | Jaulmes | 180/34 |
| 3,894,599 | 7/1975 | Murray | 180/33 C |
| 3,939,932 | 2/1976 | Rosen | 180/33 C |
| 3,991,843 | 11/1976 | Davidson | 180/34 |

FOREIGN PATENT DOCUMENTS

| 203,005 | 2/1939 | Switzerland | 200/61.12 |
| 443,948 | 2/1968 | Switzerland | 180/33 C |

*Primary Examiner*—Kenneth H. Betts
*Assistant Examiner*—Donn McGiehan
*Attorney, Agent, or Firm*—Holman & Stern

[57] ABSTRACT

An electrically assisted cycle wherein the electrical assistance is provided by an electric drive arrangement carried on the frame of the cycle and powered by a battery also carried by the frame. The output of the drive arrangement is coupled to the driven wheel of the cycle so that operation of the electric drive arrangement can propel the cycle. The drive arrangement is mounted on the frame for limited movement relative to the frame against the action of a resilient bias provided by rubber mounting bushes. An electrical switch is operated by movement of the drive arrangement relative to the frame and the electrical switch is arranged in the energizing circuit of the motor of the electric drive assembly. The switch is operated by movement of the drive arrangement from a rest position to a position wherein the rubber bushes are stressed. Until the switch is so operated the motor cannot be energized. Movement of the drive arrangement relative to the frame is effected by the rider applying driving force to the panel of the cycle. Thus until the rider of the cycle starts to propel the cycle by pedalling the electric motor cannot be energized to aid the rider. Similarly should the rider cease pedalling then immediately the motor will return under the resilient bias to its rest position and the motor will be de-energized by opening of the switch.

4 Claims, 3 Drawing Figures

MOTORIZED BICYCLE

This invention relates to an electrically assisted pedal cycle, particularly but not exclusively a bicycle.

An electrically assisted cycle according to the invention includes, a frame, a ground engaging wheel rotatably mounted on the frame, a rotatable drive member rotatably mounted on the frame and arranged to be rotated by the rider of the cycle, an endless, non-extensible, flexible member for transmitting motion of said drive member to said wheel whereby rotation of said drive member propels the cycle, an electric drive arrangement and an associated power source carried by the frame, the output of the drive arrangement being coupled to said wheel whereby said electric drive arrangement can drive the wheel, at least that part of the drive arrangement carrying the drive output being mounted on the frame for limited movement relative thereto against the action of a resilient bias, electrical switch means operable in response to movement of said part of said drive arrangement relative to the frame, and the arrangement being such that said part of said drive arrangement is moved relative to the frame, against said resilient bias to operate said switch, by the application to said drive member, by the rider, of driving force to propel the cycle, said switch means in use being so associated with the electric drive arrangement that the electric drive arrangement cannot be energised unless said switch means is operated.

Preferably said electric drive arrangement includes an electric motor and a gear mechanism the gear mechanism transmitting rotation of the motor shaft to the output of the drive arrangement, and the electric motor and the gear mechanism being combined to form a single unit which is mounted on the frame for said limited movement relative to the frame.

Desirably the mounting of the drive arrangement, or said part of the drive arrangement on the frame involves the use of resilient coupling members, the resilient coupling members affording the possibility of movement of the drive arrangement, or said part thereof, relative to the frame, and also providing said resilient bias.

Conveniently the output of the drive arrangement is engaged with said endless flexible member so that upon the application of driving force to said drive member by the rider, a force is applied by way of said endless flexible member to the output of the drive arrangement thus moving the drive arrangement, or said part thereof, relative to the frame as permitted by the mounting thereof.

One example of the invention is illustrated in the accompanying drawings, wherein.

Figure 1:
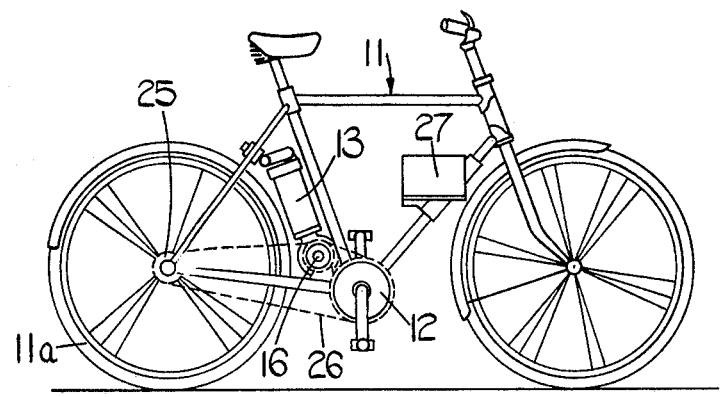
FIG. 1 is a diagrammatic side elevational view of a bicycle.
Figure 2:
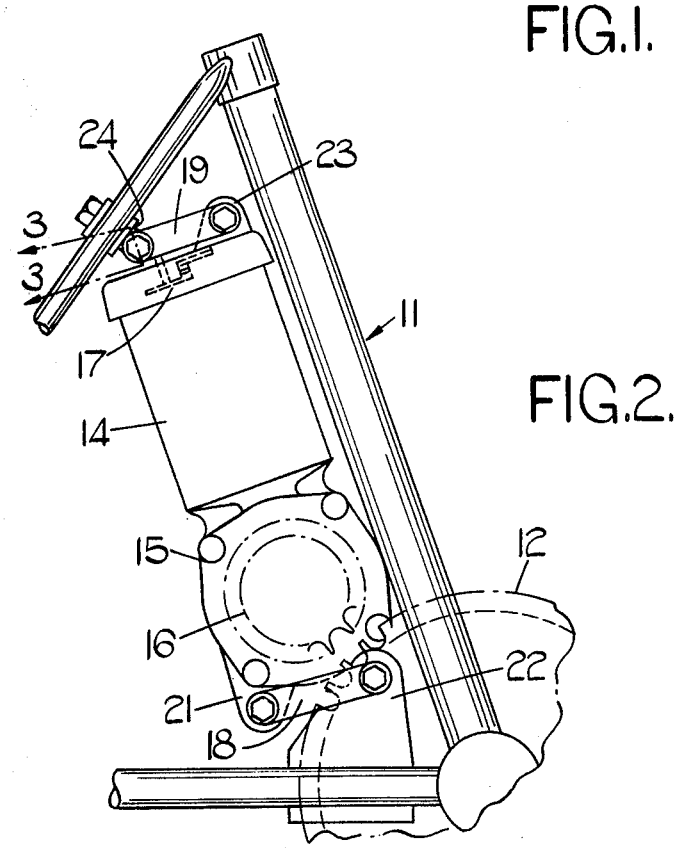
FIG. 2 is an enlarged view of part of the bicycle shown in FIG. 1.

Referring to the drawings, the bicycle includes a relatively conventional frame 11 formed from metal tube. The frame supports a ground engaging wheel 11a towards the rear of the frame, and adjacent the front of the frame is a movable handle bar assembly carrying at its lower end a second ground engaging wheel whereby the bicycle is steered in use.

The rear ground engaging wheel 11a of the bicycle carries a sprocket 25 around which extends a non-extensible, endless drive chain 26. The drive chain 26 extends forwardly of the frame of the cycle and extends around a large diameter chain wheel 12 mounted for rotation on the frame 11. The plane of rotation of the wheel 12 is parallel to the plane of the frame 11 and connected to the chain wheel 12 are a pair of pedals disposed diametrically opposite one another, and on opposite sides respectively of the plane of the chain wheel 12. Thus the rider can, in the normal manner, apply driving force to the chain wheel 12 by way of the pedals to rotate the chain wheel, and by virtue of the drive chain 26, rotate the sprocket 25 and the wheel 11a to propel the cycle. The sprocket 25 can, if desired, incorporate a freewheel mechanism so that reverse rotation of the chain wheel 12 does not drive the cycle, and the cycle can overrun the chain wheel, for example when travelling downhill.

In order to provide a measure of assistance to the rider of the bicycle when propelling the bicycle there is provided an electric drive arrangement 13 carried by the frame, and an associated electric storage battery 27 also carried by the frame 11. The electric drive arrangement 13 includes an electric motor 14 and a gear mechanism 15 the housing of the gear mechanism 15 being securely fixed to the housing of the motor 14 so that the motor 14 and gear mechanism 15 define a single unit for the purposes of mounting the drive arrangement on the frame 11. The gear mechanism 15 transmits rotation of the output shaft of the motor 14 to an output sprocket 16 on the exterior of the housing of the gear mechanism 15. The sprocket 16 is rotatable in the same plane as the plane of rotation of the chain wheel 12, and the drive chain 26 which extends around the rear wheel sprocket 25 and the chain wheel 12 also extends around the sprocket 16 of the electric drive arrangement. Thus when the electric motor 14 is energised from the electric storage battery 27 the sprocket 16 is caused to rotate, and will drive the rear wheel by way of the chain and the rear wheel sprocket.

However in order that the electric drive arrangement can only be used to assist the rider in propelling the cycle, and cannot be used to propel the cycle without effort from the rider, there is provided an electrical switch 17 which controls energisation of the motor 14 and which must be closed in order for the motor 14 to be energised. In practice the switch 17 will be a microswitch of relatively low current capacity, and will not directly control the current to the motor 14. In preference, the switch 17 will control energisation of a relay having heavy current contacts which carry the motor current. In order that the switch 17 is only closed while the rider of the cycle is applying drive force by way of the pedals the drive arrangement 13 is mounted for limited movement relative to the frame 11, and the switch 17 is arranged to be sensitive to the movement of the drive arrangement relative to the frame. Thus the drive arrangement 13 is connected to the frame 11 by way of first and second link members 18, 19. The link member 18 is connected at one end to a bracket 21 of the drive arrangement 13, and connected at its other end to a bracket 22 rigidly secured to the frame.

The connection of the link member 18 to the brackets 21, 22 is by way of rubber bushes whereby the link member 18 can pivot relative to each bracket 21, 22 the pivoting movement being permitted by distortion of the rubber bushes. Thus the rubber bushes permit the pivotal movement, while at the same time resisting the movement and providing a resilient bias to return the link member 18 to a rest orientation with respect to the brackets 21, 22. The link member 19 is similarly coupled at one end to a bracket 23 on the drive arrangement 13, and at its other end to a bracket 24 rigidly secured to the frame. Again, the coupling of the link member 19 to the brackets 23, 24 is by way of rubber bushes which permit pivotal movement of the link 19 relative to the brackets, while at the same time providing a resilient bias to return the link member 19 to a rest orientation relative to the brackets.

Figure 3:
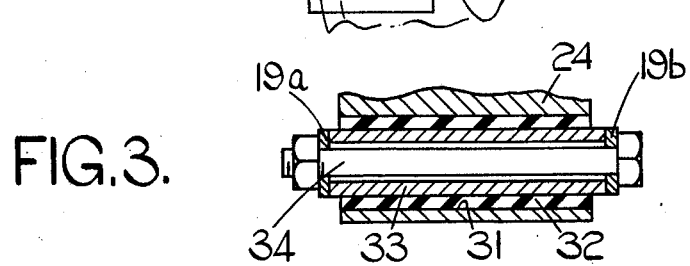
FIG. 3 is a sectional view on the line 3—3 in FIG. 2.

FIG. 3 shows in section the preferred coupling arrangement. FIG. 3 is the coupling between the link 19 and the brackets 24 but the construction of the other bushed couplings is similar. As can be seen, the link member 19 is defined by a pair of parallel links 19a, 19b, which lie on opposite sides of the brackets 23, 24 respectively. The bracket 24 defines a hollow open-ended sleeve 31 having its longitudinal axis transverse to the plane of the frame 11. Extending within the sleeve 31 is an elongate hollow rubber bush 32 and extending coaxially within the bush 32 is a second metal sleeve 33. The sleeve 33 is coaxial with the sleeve 31 and is of a longer axial length so as to project therefrom at both ends. Furthermore, the relative dimensions of the sleeve 31, 33 and the rubber bush 32 is such that the inner surface of the bush 32 binds against the outer surface of the sleeve 33 while the outer surface of the bush 32 binds against the inner surface of the sleeve 31. Thus any attempt to rotate the second sleeve 33 within the first sleeve 31 is resisted by the bush 32 and thus results in deformation of the bush 32 so that upon release of the sleeve 33 it is returned to its original position by restoration of the bush 32. One end of each of the links 19a, 19b abuts a respective axial end of the sleeve 33 and a bolt 34 extends through each link 19a, 19b, and through the sleeve 33. The head of the bolt abuts the link 19b and a nut engaged with the opposite end of the bolt 34 engages the link 19a the nut and bolt thus clamping the links 19a, 19b firmly against the projecting ends of the sleeve 33. The clamping action is such that the links cannot move relative to the sleeve 33 and so the only movement afforded at the bracket 24 between the bracket 24 and the link member 19 is by way of distortion of the bush 32, so that upon release of the links they will return under the action of the bush 32 to their original position.

The opposite ends of the links 19a, 19b of the link member 19 are similarly coupled to the bracket 23. In exactly the same manner the link member 18 is defined by a pair of parallel links which are similarly connected at their ends to the brackets 21 and 22. Thus although only the arrangement of the bracket 24 has been specifically shown, the similar arrangements at each of the other brackets will be understood.

In the absence of any external force applied to the drive arrangement 13 then while the drive arrangement 13 is inoperative the resilient rubber bushes will hold the drive arrangement 13 in a predetermined rest orientation with respect to the frame 11. The switch 17 has its body connected to the drive arrangement 13, and its operating member bearing on the link member 19. Any deflection of the drive arrangement 13 relative to the frame 11 as permitted by the rubber bushes will alter the orientation of the drive arrangement 13 with respect to the link member 19 since the drive arrangement will pivot relative to the link member 19 and the link member 19 will pivot relative to the frame. The arrangement of the switch 17 is such that in the rest orientation of the drive arrangement 13 relative to the frame 11 the switch contacts are open thus preventing energisation of the motor 14.

Since the drive chain 26 connecting the chain wheel 12 to the rear wheel sprocket extends also around the sprocket 16, then when the electric motor 14 is not energised the application by the rider, to the chain wheel 12, of driving force will increase the tension in the upper run of the chain 26 that is to say in the run of the chain which passes around the sprocket 16. The increase in tension in the upper run will apply a force to the pinion 16 tending to move the pinion 16 towards the chain wheel 12, and will thus move the drive arrangement 13 bodily relative to the frame 11 as permitted by the pivotal movement of the links 18, 19 against the action of the rubber bushes. This movement of the drive arrangement 13 relative to the frame 11 moves the body of the switch 17 away from the link member 19 closing the contacts of the switch 17 to permit energisation of the motor 14. Conveniently, the switch 17 is a normally closed switch which is held open in the rest orientation of the drive arrangement 13 relative to the frame 11.

The switch 17 will not be the only switch controlling energisation of the motor 14 since it is desirable to have a manually operable control switch on the handle bars of the cycle. Thus the manually operable control switch on the handle bars of the bicycle can be in series with the switch 17 so that closure of both switches is necessary in order to effect energisation of the motor 14. When the rider wishes to propel the cycle then he will close the manually operable control switch on the handle bars and will start to pedal the cycle. The initial application of driving force to the pedals will move the drive arrangement 13 relative to the frame 11 from its rest orientation, thus closing the switch 17 and energising the motor 14. Thereafter the motor 14 will assist the rider in propelling the cycle, and as long as the rider continues to apply driving force to the chain wheel 12 by way of the pedals then the drive arrangement 13 will remain in its displaced orientation wherein the switch 17 is closed. However, should the rider cease to apply driving force then the drive arrangement 13 will remain in its displaced orientation wherein the switch 17 is closed. However, should the rider cease to apply driving force then the drive arrangement 13 will return to its rest orientation under the action of the resilient bushes engaging the link members 18, 19 thus opening the switch 17 and deenergising the motor 14 regardless of the operative position of the manually operable control switch on the handle bars.

It will be understood that if desired the switch 17 could be opened by movement of the drive arrangement 13 from its rest orientation in which case the electrical circuit would be so arranged that opening of the switch 17 permits completion of the electrical circuit to the motor 14.

Preferably a freewheel mechanism is incorporated into the drive connection to the sprocket 16 from the gear mechanism 15 so that the chain wheel 12 can overrun the sprocket 16 so that for example the cycle can be propelled by the rider without having to overcome the resistance of the gear mechanism 15.

While the example of the invention above is described with reference to a bicycle it is to be understood that the invention is applicable to other forms of cycle for example tricycle and four-wheel pedal cycles.

We claim:

1. An electrically assisted cycle including a frame, a ground engaging wheel rotatably mounted on the frame, a rotatable drive member rotatably wound on the frame and arranged to be rotated by the rider of the cycle, an endless, non-extensible flexible member for transmitting motion of said drive member to said wheel whereby rotation of said drive member propels the cycle, an electric drive arrangement and an associated power source carried by the frame, a drive output of the electric drive arrangement being coupled to said wheel whereby said electric drive arrangement can drive the wheel means mounting at least that part of the drive arrangement carrying the drive output on the frame for limited movement relative thereto against the action of a resilient bias, electrical switch means operable in response to movement of said part of said drive arrangement relative to the frame, and the arrangement being such that said part of said drive arrangement is moved relative to the frame, against said resilient bias to operate said switch by the application to said drive member, by the rider of driving force to propel the cycle, said switch means in use being so associated with the electric drive arrangement that the electric drive arrangement cannot be energised unless said switch means is operated.

2. A cycle as claimed in claim 1 wherein said electric drive arrangement includes an electric motor and a gear mechanism, the gear mechanism transmitting rotation of the motor shaft to the drive output of the drive arrangement and the electric motor and the gear mechanism being combined to form a single unit which is mounted on the frame for said limited movement relative to the frame.

3. A cycle as claimed in claim 1 wherein the mounting of the drive arrangement, or said part of the drive arrangement on the frame involves the use of resilient coupling members, the resilient coupling members affording the possibility of movement of the drive arrangement, or said part thereof, relative to the frame, and also providing said resilient bias.

4. A cycle as claimed in claim 1 wherein the output of the drive arrangement is engaged with said endless flexible member so that upon the application of driving force to said drive member by the rider, a force is applied by way of said endless flexible member to the drive output of the drive arrangement thus moving the drive arrangement or said part thereof, relative to the frame as permitted by the mounting thereof.

* * * * *